(12) United States Patent
Thompson

(10) Patent No.: US 6,765,319 B1
(45) Date of Patent: Jul. 20, 2004

(54) PLASTIC MOLDED MAGNET FOR A ROTOR

(75) Inventor: James L. Thompson, Ypsilanti, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/412,015

(22) Filed: Apr. 11, 2003

(51) Int. Cl.⁷ .............................................. H02K 1/27
(52) U.S. Cl. ................. 310/43; 310/44; 310/156.08; 310/261
(58) Field of Search ........................... 310/43, 44, 156; 75/228; 29/598; 335/297

(56) References Cited

U.S. PATENT DOCUMENTS

| | | | |
|---|---|---|---|
| 4,888,512 A | * 12/1989 | Shimizu | 310/156.43 |
| 5,345,130 A | * 9/1994 | Kliman et al. | 310/156.13 |
| 5,465,019 A | 11/1995 | Kliman | 310/156.04 |
| 5,500,994 A | 3/1996 | Itaya | 29/598 |
| 5,532,531 A | 7/1996 | Sakamoto | 310/49 |
| 5,548,172 A | 8/1996 | Kliman et al. | 310/156 |
| 5,591,373 A | * 1/1997 | Ward et al. | 252/62.54 |
| 5,691,681 A | 11/1997 | Okugawa | 335/284 |
| 5,898,990 A | 5/1999 | Henry | 29/598 |
| 6,029,336 A | 2/2000 | Kliman et al. | 29/598 |
| 6,198,182 B1 | 3/2001 | Bustamante et al. | 310/49 R |
| 6,265,800 B1 | 7/2001 | Kimura et al. | 310/152 |
| 6,313,554 B1 | 11/2001 | Masuzawa et al. | 310/67 R |
| 6,338,900 B1 | * 1/2002 | Tada et al. | 428/402 |
| 6,400,055 B1 | 6/2002 | Aoshima et al. | 310/156.01 |
| 6,411,001 B1 | 6/2002 | Henderson et al. | 310/103 |
| 2001/0024068 A1 | 9/2001 | Aizawa et al. | 310/43 |
| 2001/0033742 A1 | 10/2001 | Weaver et al. | 388/800 |
| 2001/0043806 A1 | 11/2001 | Gorti et al. | 388/800 |
| 2002/0047313 A1 | 4/2002 | Aoshima | 310/10 |
| 2002/0097126 A1 | 7/2002 | Fujiwara et al. | 336/110 |
| 2002/0097127 A1 | 7/2002 | Fujiwara et al. | 336/178 |
| 2002/0149458 A1 | 10/2002 | Fujiwara et al. | 336/110 |
| 2002/0166520 A1 | 11/2002 | Heim et al. | 123/41.44 |

FOREIGN PATENT DOCUMENTS

| | | | | |
|---|---|---|---|---|
| JP | 61-125107 | * | 6/1986 | H01F/7/02 |
| JP | 61-210857 | * | 9/1986 | H02K/21/08 |
| JP | 63-69450 | * | 3/1988 | H02K/21/08 |
| JP | 2000-102201 | * | 4/2000 | H02K/1/27 |

* cited by examiner

*Primary Examiner*—Burton Mullins
(74) *Attorney, Agent, or Firm*—Brinks Hofer Gilson & Lione

(57) ABSTRACT

A rotor assembly for a brushless motor includes a core circumferentially affixed about a longitudinal surface of a shaft. A rotor magnet covers the entire outer surface of the core to seal the core within the magnet and to prevent exposure of the core to ambient conditions. The rotor magnet has a plurality of portions of alternating magnetic polarity and is formed of a plastic mixed with neodymium-iron-boron particles.

9 Claims, 3 Drawing Sheets

PLASTIC MOLDED MAGNET FOR A ROTOR

BACKGROUND

1. Technical Field

The present invention relates generally to electric motors, and more particularly relates to rotors in brushless electric motors for use in automotive vehicles.

2. Background Information

A typical brushless motor includes a stator with teeth and coil windings, such as low resistance copper wires, wound on the teeth. During the operation of the motor, a current is passed through the windings to generate an electromagnetic field that interacts with permanent magnets attached to a core of a rotor positioned within the stator. The rotor is in turn coupled to a shaft mounted on a set of bearings so that the electric current passing through the windings is converted to mechanical rotation of the shaft as a result of the interaction between the permanent magnets of the rotor and the electromagnetic field generated by the windings. The shaft commonly provides a physical transfer of the mechanical energy to some other mechanism that may be coupled to the shaft.

In many types of motors, the core of the rotor is laminated steel material and is exposed to ambient conditions. As such, fluid is able to seep through the laminates into the core and thus corrode the core, thereby compromising the structural integrity of the core. Furthermore, since the magnets are usually secured to the core with a retainer mechanism, a post balancing operation may be required to balance the rotor after it has been assembled.

From the above, it is seen that there exists a need for a rotor that has reduced susceptibility to corrosion and that eliminates post balancing requirements.

BRIEF SUMMARY

In overcoming the above mentioned and other drawbacks, the present invention provides a rotor for an electromagnetic motor with a plastic bonded magnet. The plastic bonded magnet is injection molded to a core, which in turn is affixed to a shaft. The percentage of magnetic material bonded to the plastic in the rotor can be tailored to the flux requirements of the motor.

In one embodiment, a rotor assembly for a brushless motor includes a core circumferentially affixed about a longitudinal surface of a shaft and a rotor magnet injection molded about the core. The magnet covers the entire outer surface of the core. By covering the entire outer surface of the core, the magnet seals the core within the magnet to prevent exposure of the core to ambient conditions, particularly corrosive fluids. As is typical for rotor construction, the rotor magnet has a plurality of portions of alternating magnetic polarity. In the present construction, these portions are formed of a plastic mixed with neodymium-iron-boron.

The foregoing discussion has been provided only by way of introduction. Nothing in this section should be taken as a limitation on the following claims, which define the scope of the invention.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1:
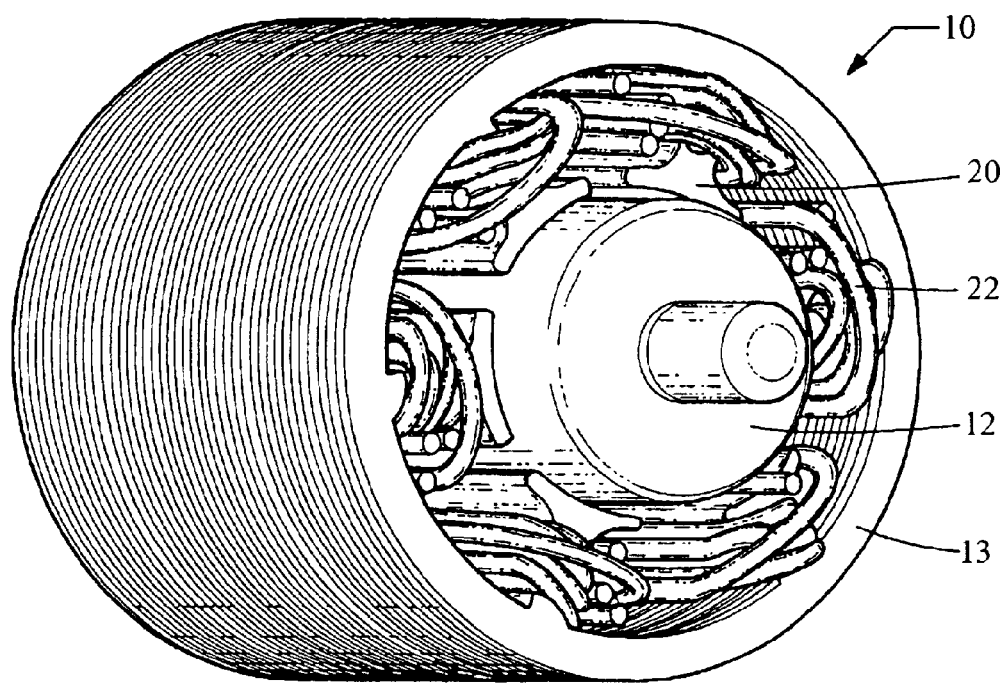
FIG. 1 is a perspective view of a rotor and stator of a brushless motor.
Figure 2:
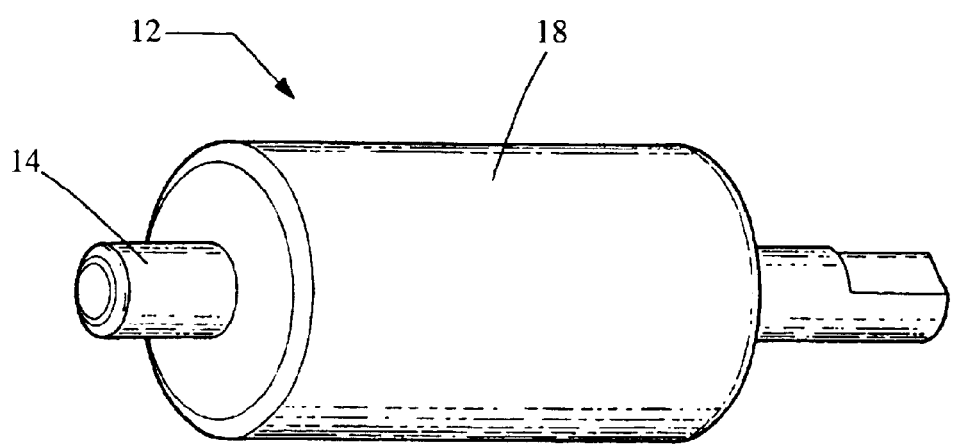
FIG. 2 is perspective view of the rotor of FIG. 1 in accordance with the invention.
Figure 3A:
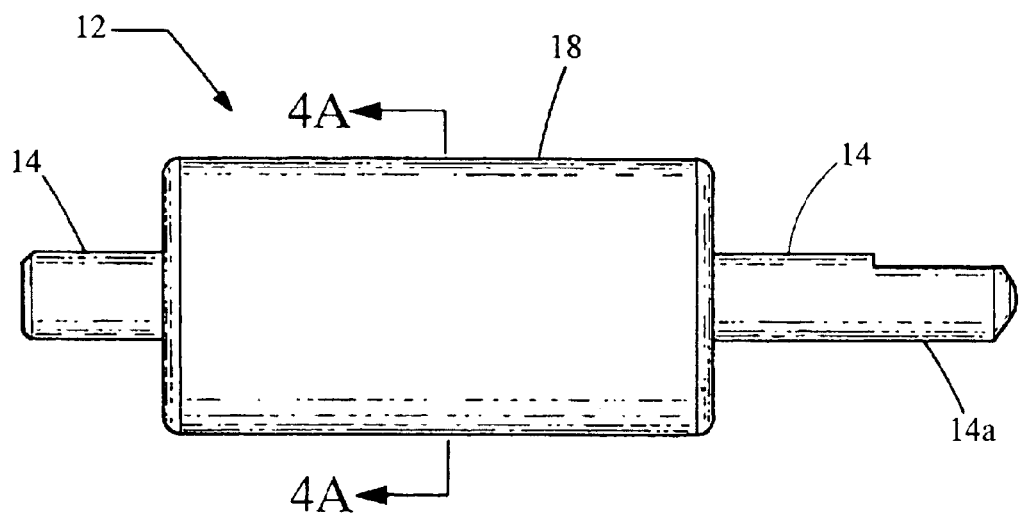
FIG. 3A is a side view of the rotor of FIG. 2.
Figure 3B:
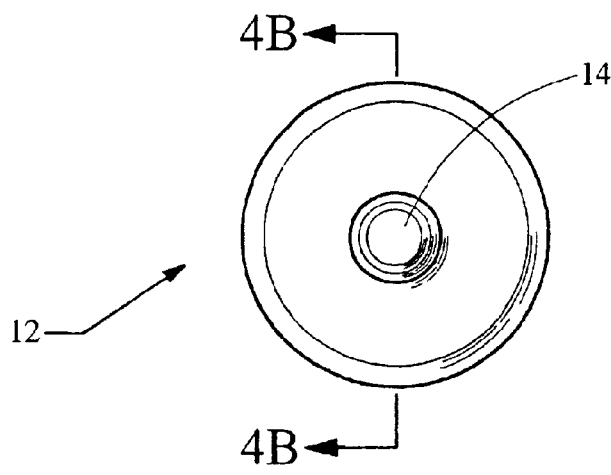
FIG. 3B is an end view of the rotor of FIG. 2.

FIG. 1 illustrates the main components of a brushless motor 10, a rotor 12 positioned in a stator 13. The rotor 12 is supported within the stator 13 to allow the rotor 12 to rotate relative to the stator 13.

Figure 4A:
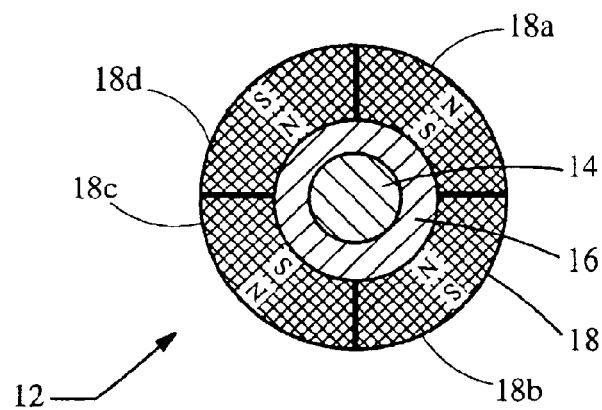
FIG. 4A is a cross-sectional view of the rotor taken along the line 4A—4A of FIG. 3A.
Figure 4B:
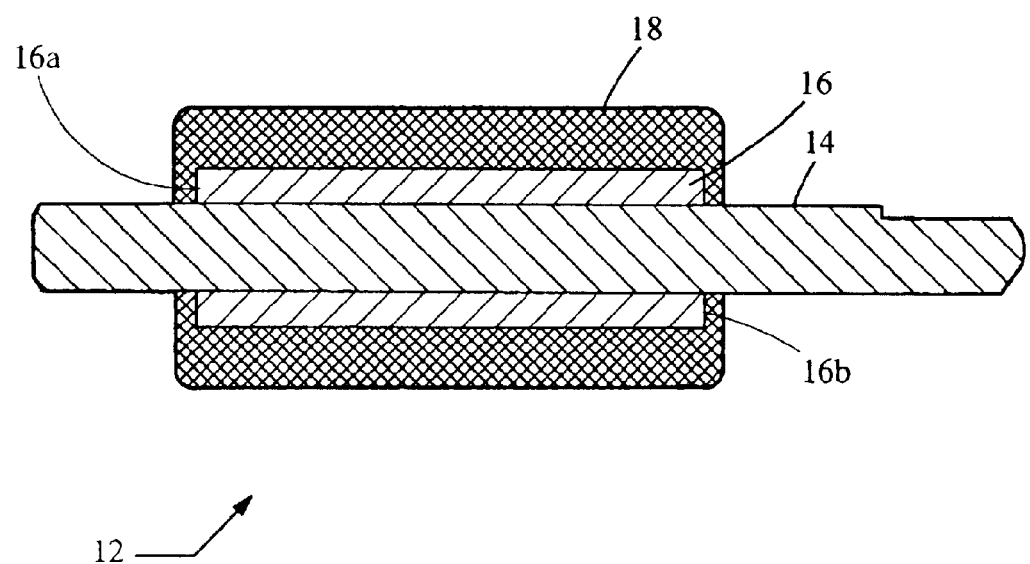
FIG. 4B is a cross-sectional view of the rotor taken along the line 4B—4B of FIG. 3B.

Referring also to FIGS. 2 through 4B, there is shown a particular embodiment of the rotor 12 removed from the stator 13. As seen therein, the rotor 12 includes a shaft 14, a core 16, and a rotor magnet 18. The shaft 14 is supported by a set of bearings positioned on both sides of the magnet 18. The core 16 provides a suitable structural support to the magnet 18 and a flux path to the opposing poles of the magnet 18. Moreover, the core 16, best seen in FIGS. 4A and 4B, is completely encapsulated by the magnet 18. This encapsulation results in the core 16 being completely sealed to prevent exposure of the core 16 to ambient conditions, particularly corrosive fluids. Hence, the motor 10 can be used, for example, in a fuel pump even though the rotor 10 may be exposed to fuels, such as alcohols, gasoline, diesel fuel, and kerosene, without exposing the core 16 to such fuels.

As shown in FIG. 4A, the rotor magnet 18 is a four-pole magnet divided into four portions 18a, 18b, 18c, and 18d positioned circumferentially about the core 16 and is thus a four-pole magnet. These portions 18a, 18b, 18c, and 18d are magnetized radially such that the polarity of circumferentially adjacent portions alternate. Thus, the pole portions 18a and 18c are provided with their S pole radially inward and their N pole radially outward, while the adjacent pole portions 18b and 18d are provided with their S pole radially outward and their N pole radially inward.

Note that in other embodiments, the rotor magnet 18 can be magnetized axially so that the change in polarity of the portions occurs along the length of the portions. Moreover, the rotor magnet 18 can be provided as a two-pole magnet or it can be provided with more than four-poles, for example, 10 or more poles.

The stator 13 includes a set of teeth 20 about which a coil such as a wire 22 is wound. The wire 22 is made of a conductive material such as copper. As shown in FIG. 1, the stator 13 is a six-slot stator. That is, there are six slots that separate the individual teeth 20.

During the operation of the motor 10, current flows through the wire 22 producing an electromagnetic field that interacts with the pole portions 18a, 18b, 18c, and 18d of the rotor magnet 18. This interaction causes the rotor 12 to rotate relative to the stator 13.

In a typical application, the motor 10 may produce about 75 watts, and the rotor 12 may rotate at about 8,500 rpm.

However, the motor 10 can have an output between about 50 and 150 watts, while the rotor 12 can rotate between about 5,000 to 40,000 rpm, depending on the specific application of the motor 10.

The rotational output of the rotor 12 can be harnessed to drive a variety of devices. To achieve this, on end 14a of the shaft 14 is coupled to drive a mechanism, such as pump used, for example, in a fuel pump of a vehicle.

Preferably, the shaft 14 is formed of stainless steel, such as SS 440, and has a diameter between about 3 to 10 mm. The shaft can be formed of other suitable materials including other steels. Furthermore, the shaft 12 can be made of a magnetic or non-magnetic material.

The core 16 is preferably constructed of a powered metal, such as powdered iron, cold rolled steel, a plastic metallized core, or any other suitable material. For example, the core 16 can be made of a polymer, such as polyphenylene sulfide (PPS), and a powered metal, such as a magnetic soft iron powder, that are mixed together with known processing aids. In some implementations, the composition of the core 16 is about 50% to 65% iron powder by volume, with the balance being the polymer and processing aids. The core 16 can be formed about and affixed to the shaft 14 in an injection molding process.

The outer diameter of the core 16 will particularly depend on the application of the motor 10. For the 75 watt motor mentioned above, the ore 16 may have an outer diameter of about 9 mm.

The rotor magnet 18 is formed of a magnetic metal powder mixed with a suitable plastic and processing aids. In one implementation, the magnetic metal powder is neodemium-iron-boron particles and the plastic is PPS. The composition of the magnet is tailored to the flux requirements of the motor 10. For example, with a flux requirement of the 75 watt motor discussed above, the magnet may be composed of about 50% to 65% neodemium-iron-boron by volume bonded with PPS with processing aids. The outer diameter of the rotor magnet is determined by the particular application. For instance, in the above mentioned 75 watt embodiment, the diameter of the rotor magnet is about 16 mm.

The rotor magnet 18 is formed onto the core 16 using an injection molding process such that the magnet 18 extends over the ends 16a and 16b of the core 16, thereby sealing the core 16 within the magnet 18. Forming the magnet 18 in this manner eliminates any pathway for permeation of a fluid from outside the magnet 18 into the core 16, and in particular between the core 16 and the shaft 14. As such, the core 16 is not exposed to potentially corrosive environments, and the structural integrity of the core 16 and integrity of the bond between the core 16 and the shaft 12 is preserved.

Accordingly, separate individual magnets do not have to be attached to the core 16. Rather, the magnet 18 is formed as a single piece onto the core 16 and subsequently magnetized. Thus, the rotor 12 does not need any additional fabrication steps to retain the magnet 18 to the core 16 beyond the injection molding process. That is, no external or additional retainer is required to affix the magnet 18 to the core 16. Without such a retainer, the rotor 12 does not require a post balancing process after the rotor has been assembled. By eliminating conventional retention mechanisms and the post balancing process, capital expenses for such fabrication steps are eliminated, thus lowering the overall manufacturing costs of the rotor 12.

Furthermore, as mentioned above, the magnetic properties of the magnet 18 can be modified to tailor the rotor 12 to fulfill the flux requirements of a particular motor 10. Also, the volume ratio of metal to plastic of the magnet 18 and/or the composition of the magnet 18 can be easily selected or change to produce a desired flux for a particular application.

As compared to conventional rotors, the rotor 12 has a higher performance per magnet volume such that it requires less mass to produce a given amount of power. Because of the light weight and resulting low inertia of the rotor 12, the operation of the rotor 12 produces less vibration and noise, which therefore may extend the life of the bearings supporting the rotor 12.

It is therefore intended that the foregoing detailed description be regarded as illustrative rather than limiting, and that it be understood that it is the following claims, including all equivalents, that are intended to define the spirit and scope of this invention.

What is claimed is:

1. A rotor assembly for a brushless motor, comprising:
   a shaft;
   a core injection molded about the shaft circumferentially over a longitudinal surface of the shaft; and
   a rotor magnet having a plurality of portions of alternating magnetic polarity, the rotor magnet being formed of a plastic mixed with neodymium-iron-boron particles and being injection molded onto the core, the core being encapsulated within the magnet to prevent exposing the core to ambient conditions outside the magnet.

2. The rotor assembly of claim 1, wherein the volume of the neodymium-iron-boron particles is between about 50% to 65%.

3. The rotor assembly of claim 1, wherein the core is formed of a powered metal.

4. The rotor assembly of claim 1, wherein the core is formed of a cold-rolled steel.

5. The rotor assembly of claim 1, wherein the plastic of the rotor magnet is polyphenylene sulfide.

6. The rotor assembly of claim 1, wherein the core is formed of a plastic mixed with a powered metal.

7. The rotor assembly of claim 6, wherein the volume of powdered metal in the core is about 50% to 65%.

8. The rotor assembly of claim 6, wherein the plastic of the core is polyphenylene sulfide.

9. The rotor assembly of claim 8, wherein the metal of the core is iron powder.

\* \* \* \* \*